ately fixed voltage. Means are also connected for gating pulses having the same repetition rate into the second time-measuring counter during a time interval which is shorter than the predetermined time interval. The amount by which this time interval is shorter than the predetermined time interval is proportional to a given value of a variable quantity. As a result, the difference between the respective counts entered into the first and second time-measuring counters is also proportional to this given value. In the specific embodiment of the invention mentioned previously, this shorter time interval may be the duration of another polarity of the output of the same magnetic multivibrator. Furthermore, this other polarity may have its duration shortened by the imposition of an additional voltage upon the appropriate side of the multivibrator circuit, thus taking advantage of the voltage-sensitive properties of magnetic multivibrators. In this case, the added voltage is the variable quantity the value of which is detected by the analog-digital converter of this invention.

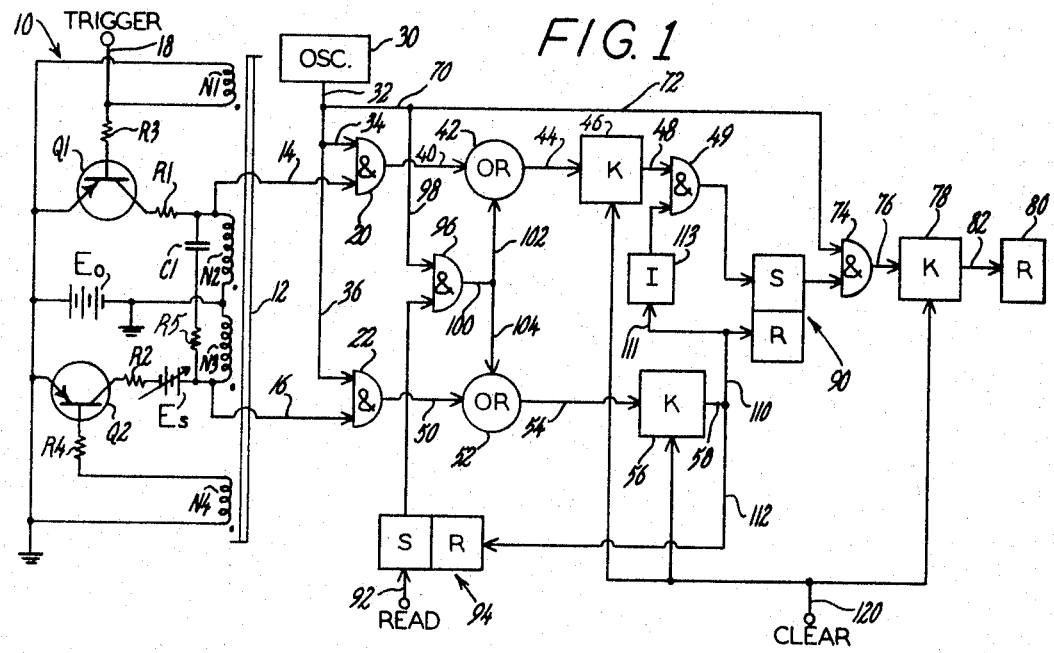

Means are also connected for thereafter gating a stream of pulses into both of the time-measuring counters until both these counters attain their modulus.

United States Patent Office 3,319,243
Patented May 9, 1967

3,319,243
ANALOG-DIGITAL CONVERTER EMPLOYING AN ASYMMETRICAL MULTIVIBRATOR
Wilmer C. Anderson, Greenwich, Conn., assignor to General Time Corporation, New York, N.Y., a corporation of Delaware
Filed July 6, 1964, Ser. No. 380,207
13 Claims. (Cl. 340—347)

This invention relates to analog-digital conversion. In particular, it concerns a circuit in which the voltage sensitivity of a magnetic multivibrator circuit is employed to vary the duration of one polarity of the multivibrator cycle relative to that of the other polarity. Simple, well-known digital circuits are then employed to provide a numerical indication of the voltage as manifested by the disparity in duration of the two multivibrator pulses.

One object of the invention is to apply the voltage-sensitive properties of magnetic multivibrators to a digital voltmeter. Another object of the invention is to provide a linear voltmeter. Still another object is to provide a voltmeter which is inherently compensated against errors due to supply voltage drift or ambient temperature changes. A still further object of the invention is to provide an analog-digital converter which employs simple and well-known digital circuit blocks.

Briefly stated, this invention provides an output counter, means for generating a stream of pulses, and means connected for gating pulses into the output counter. A flip-flop is provided which is settable for enabling the gate, and resettable for disabling it. Then, by providing means which set and thereafter reset the flip-flop to enable the gate for a measured time, I am able to govern the number of pulses gated into the output counter.

To accomplish this, I provide first and second time-measuring counters each of which produces an output when the count thereof reaches a selected modulus. The first time-measuring counter is connected for its output to set the flip-flop, thus starting the measured time. The second time-measuring counter is connected for its output to reset the flip-flop, thus ending the measured time.

Means are then connected for gating pulses at a selected repetition rate into the first time-measuring counter during a predetermined time interval. In a specific form of the invention, the predetermined time interval may be the duration of one polarity of the output of a magnetic multivibrator, this particular duration being dependent upon a relatively fixed voltage. Means are also connected for gating pulses having the same repetition rate into the second time-measuring counter during a time interval which is shorter than the predetermined time interval. The amount by which this time interval is shorter than the predetermined time interval is proportional to a given value of a variable quantity. As a result, the difference between the respective counts entered into the first and second time-measuring counters is also proportional to this given value. In the specific embodiment of the invention mentioned previously, this shorter time interval may be the duration of another polarity of the output of the same magnetic multivibrator. Furthermore, this other polarity may have its duration shortened by the imposition of an additional voltage upon the appropriate side of the multivibrator circuit, thus taking advantage of the voltage-sensitive properties of magnetic multivibrators. In this case, the added voltage is the variable quantity the value of which is detected by the analog-digital converter of this invention.

Means are also connected for thereafter gating a stream of pulses into both of the time-measuring counters until both these counters attain their modulus.

The measured time between the output of the first and second counters is then proportional to the difference between the respective counts previously entered into the time-measuring counters. This difference between the counts, in turn, is proportional to the disparity in duration between the different polarity output pulses of the multivibrator. This disparity in duration, furthermore, represents the value of the variable analog quantity, e.g. the added voltage applied to one side of the multivibrator circuit. Thus, the time during which pulses are gated into the output counter is proportional to the value of the variable quantity, and as a result the number of pulses gated into the output counter during this measured time is also proportional to the variable quantity. Accordingly, the read-out of the numerical value stored in the output counter is a representation of the analog value of the variable quantity.

This device has obvious direct application as a digital-reading voltmeter. It is also usable for generating a numerical indication of the value of any other variable analog quantity which can be represented by a voltage.

The features of the invention will now be explained in greater detail in connection with the following drawings:

FIG. 1 is a schematic circuit and block diagram of an analog-digital conversion system according to this invention;

FIG. 2 is a set of waveforms illustrating the voltage-sensitive operation of the asymmetric magnetic multivibrator circuit which forms a part of the system of FIG. 1; and FIG. 3 is a block diagram representation of the analog-digital conversion system of FIG. 1 with the addition of certain features for more automatic operation thereof.

In the system of FIG. 1 circuit 10 is an asymmetric monostable magnetic multivibrator. It includes a saturable magnetic core 12 and windings N1, N2, N3, and N4 wound about the core 12. When the circuit 10 is in its quiescent state, the output leads 14 and 16 coming from opposite sides of the multivibrator are both at ground potential. To start the circuit, a negative triggering pulse is applied to input lead 18. This momentarily energizes the base of Q1 and causes Q1 to conduct current from the fixed supply source $E_0$ through a limiting resistor R1 and winding N2. The result of this current pulse is to induce a voltage in winding N1 which sustains conduction of Q1. This conduction continues until the current through N2 has saturated the core 12. At that point, no further induction takes place, and the sustaining voltage across winding N1 terminates, allowing Q1 to turn off. The collapse of flux during turn-off of Q1 induces a voltage in winding N4 which energizes the base of Q2 and causes Q2 to turn on. The conduction of Q2 sends a pulse of current from the supply source $E_0$ through limiting resistor R2 and winding N3. Winding N3 then induces a voltage in winding N4 which sustains conduction of Q2 until the current in winding N3 has saturated core 12 in the opposite direction. R3 and R4 are base limiting resistors, and the value of R3 is selected so that the collapse of flux when Q2 ceases to conduct is not sufficient to start Q1 conducting again. This makes the circuit 10 a monostable rather than a free running magnetic multivibrator circuit. Therefore, the circuit goes through one full cycle of saturation by Q1 and reversed saturation by Q2 and then returns to the quiescent state. Resistor R5 and capacitor C1 are employed for damping purposes.

In magnetic multivibrator circuits the duration of each portion of the cycle is dependent in part upon the voltage which drives the core to saturation, and in part upon the ambient temperature. As a result, one of the problems in using these circuits is that ways must be found of compensating for their variability in the face of varying supply voltages and ambient temperatures. It is one of the advantages of the analog-digital conversion system disclosed by this specification that it is inherently compensated for such variations.

In this invention the voltage-sensitivity of the monostable magnetic multivibrator 10 is used intensionally to make the two parts of the multivibrator cycle asymmetrical, the degree of asymmetry being a measure of a varying voltage. When the circuit 10 is in that part of its cycle during which Q1 conducts, the driving voltage is simply the supply source $E_0$. As a result, the duration of this phase of the multivibrator cycle is a time which is determined in part by the value of $E_0$. However when the monostable multivibrator 10 enters upon the second phase of its cycle, during which Q2 conducts, the driving voltage is seen to be $E_0$ plus a variable voltage $E_s$ which is connected in series aiding relationship therewith. Thus, the core 12 is driven back down to reverse saturation by a greater voltage $E_0$ plus $E_s$. As a result, the second phase of the cycle takes a shorter time. The percentage decrease in duration of the Q2 part of the multivibrator cycle relative to the Q1 part is equal to the percentage increase which voltage $E_s$ represents over and above voltage $E_0$. In the operation of this analog-digital conversion system, voltage $E_s$ represents the analog signal quantity which the system reads out in numerical form.

During the time that Q1 is conducting, the voltage on output lead 14 goes high owing to the voltage drop across winding N2 during saturation of the core 12. Therefore, during the first phase of the multivibrator cycle the voltage on output lead 14 enables the and-gate 20. Similarly, during the second phase of the multivibrator cycle, when Q2 is conducting, the voltage drop across winding N3 causes the potential on output lead 16 to go high and thus enable the and-gate 22.

This will be more fully appreciated by observing the output voltage on lead 14 during typical cycles of circuit operation as they are illustrated in FIG. 2. In this figure waveform A illustrates a symmetrical cycle of the monostable multivibrator circuit 10 which occurs when the signal voltage $E_s$ is equal to zero. The first half of the cycle produces a positive square pulse on output lead 14, followed by a negative square pulse of equal duration during the second half of the cycle. In contrast to this, waveform B illustrates the typical cycle which occurs when the signal voltage $E_s$ is greater than zero. Once again, the first part of the cycle consists of a positive square pulse on the output lead 14 of duration determined by the relatively fixed source voltage $E_0$. The second part of the cycle, however, consists of a negative square pulse on the lead 14 which is of shorter duration owing to the fact that the effective supply voltage during this part of the cycle is $E_0$ plus $E_s$. It will be appreciated that the output voltages on lead 16 have the same time duration as those for lead 14 illustrated in FIG. 2, but are of opposite polarity. In other words, the output on lead 16 consists of a negative-going square pulse of relatively fixed duration during the first part of the cycle, followed by a positive square pulse during the second part of the cycle. The duration of this latter part of the cycle is determined by the sum of the fixed supply $E_0$ plus the variable signal voltage $E_s$. Accordingly, during each cycle of the monostable multivibrator 10 the and-gate 20 is first enabled for a predetermined time period by the output voltage on lead 14, after which gate 20 is disabled and gate 22 is enabled by the output voltage on lead 16 for a time which is foreshortened in proportion to the value of the signal voltage $E_s$. When the single cycle of the monostable circuit 10 is completed, no further output voltages are induced in the windings, and as a result both gates 20 and 22 remain disabled while the circuit 10 is in a quiescent condition.

In the operation of this analog-digital conversion system, the signal voltage $E_s$ is applied between limiting resistor R2 and winding N3. The system can then be operated to provide a numerical indication of the value of $E_s$, either for the purpose of measuring $E_s$ itself, or for the purpose of measuring some other quantity which is represented by $E_s$.

First, the monostable magnetic multivibrator 10 is caused to go through one full cycle of operation by applying a triggering pulse to the input lead 18. As a result, and-gate 20 is then enabled for a predetermined time interval, after which and-gate 22 is enabled for a time interval which is a function of the value $E_s$ to be measured. During the time that and-gate 20 is enabled, pulses from the oscillator 30 are applied over leads 32 and 34 to be passed through the and-gate 20. The oscillator 30 may be any known circuit providing a steady stream of pulses at a repetition rate high enough to insure that a relatively large number of pulses can occur during each part of the cycle of monostable multivibrator 10, even the aforeshortened part of the cycle. The higher the repetition rate of oscillator 30 is in relation to the duration of the output pulses of monostable multivibrator 10, the better will be the numerical resolution of the read-out of this analog-digital conversion system. An exemplary circuit which could serve as the oscillator 30 of this system is disclosed in U.S. patent application, Ser. No. 210,410, "Magnetic Oscillator," filed July 17, 1962, not Patent No. 3,194,597, which has the assignee and one inventor in common with this present case.

The pulses from oscillator 30 which pass through the and-gate 20 during the predetermined time that it is enabled emerge over lead 40 and pass through or-gate 42 and then proceed over lead 44 to a pulse counter 46. This counter may be any circuit which has a predetermined modulus or maximum count, and which counts pulses received by it, stores the count between pulses, and finally produces an output pulse when the stored value reaches the predetermined modulus. The full count output appears on a lead 48. The counter 46 may be of the incremental magnetic type disclosed in U.S. Patent No. 2,897,380 of Neitzert, which is assigned to the assignee of this invention.

The time during which the and-gate 22 is enabled is shorter than the enabling time of the other and-gate 20 by an amount which is proportional to the value of the signal voltage $E_s$. During this shorter enabling interval, pulses from the oscillator 30 travel over leads 32 and 36 and are passed through the and-gate 22. They then emerge over a lead 50 and go through an or-gate 52 and over a lead 54 to a second time-measuring counter 56 which may be of the same type as the first time-measuring counter 46. The modulus of both counters 46 and 56 should be identical. When counter 56 reaches its full count, it supplies an output over a lead 58.

After one full cycle of the monostable multivibrator 10, the and-gate 20 will have been enabled for a predetermined period of time. As a result, for a given repetition rate of oscillator 30, a predetermined number of pulses will have been passed into the first time-measuring counter 46. The system should be designed so that the number of pulses gated into counter 46 during this first part of the cycle of multivibrator 10 is somewhat less than the capacity or modulus of the counter. During the shorter time interval that gate 22 was enabled a smaller number of pulses was gated into the second time-measuring counter 56. Since these two time-measuring counters have the same modulus, it follows that this smaller number of pulses in counter 56 will also be less than the capacity or modulus of the counter.

Now, in order to read-out the numerical value of the voltage $E_s$, pulses from the oscillator 30 are going to be applied over leads 32, 70, and 72 through an and-gate 74 and over a lead 76 to an output counter 78. The number of pulses thus gated into the output counter 78 is to be proportional to the value of the signal voltage $E_s$. As a result, the value of the count entered into the output counter 78 will be proportional to the value of the variable quantity $E_s$. This count in the output counter 78 can be displayed on a read-out device 80 which is connected to the output counter 78 by means of a lead 82.

The exact nature of the output counter 78 and read-out device 80 will depend upon certain design considerations, such as the repetition rate of oscillator 30. If the repetition rate of oscillator 30 does not exceed about 100 pulses per second, then this counting rate may be within the capacity of an electromechanical counter of the type which is well known in the art. In this case, the output counter 78 might be such a device, while the read-out mechanism 80 would be one or more number wheels usually associated with electromechanical counting devices. When operating with such a low oscillator repetition rate, it would be desirable for the full cycle of the monostable multivibrator 10 to have a relatively long period, for example one full second, which is feasible with circuits of this type, and which would give adequate resolution in conjunction with an oscillator repetition rate of 100 pulses per second. If a shorter multivibrator period and/or a faster oscillator repetition rate are desired, it would probably be necessary to use any well-known type of electronic device such as a flip-flop ring counter to serve as the output counter 78 of this system. In this case, the read-out device 80 could be any well-known electronic display device, such as a Nixie tube system, or a segmented or monogram type of numerical display with a diode encoding matrix.

As noted previously, the gate 74 is to be enabled for a measured time interval which is proportional to the value of the signal voltage $E_s$. This is accomplished by setting a flip-flop 90 to enable the gate 74 at the start of the measured time interval, and then resetting the flip-flop 90 to disable the gate 74 at the end of the measured time interval. The function of setting and then resetting the flip-flop 90 at the appropriate times is performed by the time-measuring counters 46 and 56.

Keep in mind that these two time-measuring counters 46 and 56 have respective counts stored therein, these counts having been entered during the previously described single cycle of the monostable multivibrator circuit 10. In order to initiate the read-out operation a read-command pulse is applied to a lead 92 to set a flip-flop 94. This then enables an and-gate 96 to allow pulses from the oscillator 30 which arrive over leads 32, 70, and 98 to pass through the gate 96 and proceed over leads 100, 102, and 104 to both of the or-gates 42 and 52. These pulses then emerge over leads 44 and 54 and proceed to the time-measuring counters 46 and 56 respectively. This stream of pulses continues to flow into the time-measuring counters 46 and 56 until both of these counters have attained a count equal to their modulus, i.e. have been filled to capacity. Since the counter 46 has a higher count, it will fill up first and produce an output which passes over lead 48 and through a normally enabled and-gate 49 to set the flip-flop 90 and thus start the measured time interval during which gate 74 is enabled. Counter 56, having the smaller stored count, will fill up somewhat later, producing an output over leads 58 and 110 to reset the flip-flop 90 and terminate the measured time interval. The output from counter 56 is also applied over a lead 112 to reset the read flip-flop 94 and thus disable the and-gate 96 to prevent the counters 46 and 56 from being continually recycled. This prevents the flip-flop 90 from being continuously recycled to upset the reading which has been entered into the output counter 78 during the first cycle of the flip-flop 90.

For any value of $E_s$ the measured time between the output of counter 46 which sets the flip-flop 90 and the output of counter 56 which resets the flip-flop 90, is proportional to the value of voltage $E_s$. If the voltage $E_s$ is zero, the multivibrator pulse durations and therefore the counts stored in counters 46 and 56 would be equal. Thus the outputs of these counters would occur simultaneously during the read-out operation; i.e. the measured time would, like $E_s$, be zero. In that event, the output from counter 56 is applied over lead 111 and activates an inverter 113 to inhibit the normally enabled gate 49. This blocks the simultaneous output of counter 46 and prevents it from setting flip-flop 90. Accordingly, gate 74 is not enabled, no pulses reach the output counter 78, and the voltage $E_s$ is read out as zero, its actual value.

Now let us consider values of $E_s$ greater than zero. Let the capacity or modulus of the two time-measuring counters 46 and 56 be equal to N. Let the number of pulses previously entered into the counter 46 during the first half of the multivibrator cycle be equal to $n_0$. Let the count previously entered into the second time-measuring counter 56 be equal to $n_s$. The number of additional pulses required to fill the counter 46 is equal to $N-n_0$, and the number required to fill counter 56 is equal to $N-n_s$. Therefore, after the read command input is applied to the lead 92, the amount of time which elapses until the counter 46 sets the flip-flop 90 is equal to the time required for oscillator 30 to produce $N-n_0$ pulses. Since flip-flop 90 enables and-gate 74 this is also the time at which pulses from oscillator 30 begin to pass into output counter 78. After the oscillator 30 has simultaneously supplied $N-n_s$ pulses to counter 56 and thereby filled it, an output pulse from counter 56 will reset flip-flop 90 and disable and-gate 74, thereby stopping the flow of pulses from oscillator 30 to output counter 78. Thus, the time interval during which pulses are passed to output counter 78 will be that required for oscillator 30 to supply $(N-n_s)-(N-n_0)$ pulses; that is the time from the start of the read-out operation to the disabling of gate 74 (equivalent to $N-n_0$ pulses) minus the time from the start of read-out to the enabling of gate 74 (equivalent to $N-n_0$ pulses). After an obvious algebraic simplification of the quantity $$(N-n_s)-(N-n_0)$$

this is seen to be equal to the time necessary for the oscillator 30 to produce $n_0-n_s$ pulses. In other words, the measured time during which gate 74 is enabled is proportional to $n_0-n_s$, which represents the difference between the standard number of pulses passed through the and-gate 20 and the reduced number of pulses passed through the and-gate 22. This reduction in the number of pulses is proportional to the shrinkage in time duration of the positive output on lead 16 caused by the signal voltage $E_s$, which in turn is proportional to that voltage $E_s$. Therefore, the measured time during which gate 74 is enabled is proportional to the given value of the variable quantity $E_s$. Consequently, the number of pulses of a fixed repetition rate passed through and-gate 74 to the output counter 78 during that time is a numerical quantity proportional to the value of the analog variable $E_s$. The read-out device 80 will therefore provide a numerical indication of the magnitude of $E_s$.

At the end of this read-out operation a clear-pulse is applied to a lead 120, this pulse branching out to the respective counters 46, 56, and 78 to reset them all to zero prior to the taking of another reading. Then, when the next reading is desired it is only necessary first to trigger the monostable multivibrator 10 and subsequently apply a read-command pulse to set the flip-flop 94. The nature of the clear-input applied to the lead 120 will of course depend upon the nature of the counters 46, 56, and 78. Incremental magnetic counters of the type disclosed in the aforesaid Neitzert patent may be easily cleared to zero by driving a current through a winding which sets the magnetic core of these counters to its initial state of magnetic saturation. As to electromechanical counters and electronic ring counter devices, methods for resetting these to zero are well known in the art.

It will now be appreciated that the analog-digital conversion system of this invention provides a convenient means by which a voltage which varies in an analog manner, or any other quantity which can be represented by such a voltage, is conveniently measured and read out by means of simple and well-known digital circuit blocks arranged in the novel system disclosed herein. As an additional advantage of this system, let us consider the effect of a drift in the supply voltage $E_0$ or of a change in ambient temperature. One of the problems with circuits employing saturable magnetic cores such as the core 12 has been the fact that a change in the voltage employed to drive the core to saturation will produce a corresponding change in the duration of the output pulses derived from such circuitry, this change being undesirable. Changes in the ambient temperature also produce undesirable changes in pulse duration by affecting the magnetic characteristics of the core itself. In the system of this invention, however, the effect of such changes is largely compensated for in the following manner. The supply voltage $E_0$ is applied equally to both sides of the monostable multivibrator circuit 10. So far as the Q1 side of the circuit is concerned, $E_0$ is the sole voltage source, whereas the Q2 side of the circuit receives as its energizing voltage the sum of $E_0$ plus $E_s$. The presence of $E_0$ as a term in the expression for the total voltage available on both sides of the circuit means that a change in $E_0$ will effect both sides approximately equally. Thus, a decrease in $E_0$ will cause an increase in the output pulse duration on lead 14, but it will also cause an approximately equal and compensating increase in the output pulse duration on lead 16. The compensation effect arises from the fact that the operation of this analog-digital conversion system depends not upon the absolute magnitude of the pulse durations illustrated in FIG. 2, but upon the difference between them. Therefore if both pulse durations are affected approximately equally, the error due to any change in absolute pulse duration is largely cancelled out. The same is true for increases in the value of voltage $E_0$, and also for changes in pulse duration caused by variation of ambient temperature.

FIG. 3 shows a modification of the basic analog-digital conversion system in FIG. 1. The principal changes are the substitution of a three-input and-gate 96a for the two-input and-gate 96 of FIG. 1, and the substitution of a tristable circuit arrangement 94' in place of the bistable flip-flop circuit 94 of FIG. 1. The effect of these changes is to make the system somewhat more automatic in its operation. More specifically, when taking a reading with the system of FIG. 3 it is only necessary to apply the triggering pulse to the lead 18 to initiate the cycle of the monostable multivibrator circuit 10, and at the end of that cycle the tristable circuit 94' will automatically cause the system to perform the read-out operation which in the system of FIG. 1 had to be separately initiated by applying a pulse to lead 92.

The circuit 94' has three different stable states of operation. The first of these is its stand-by condition, in which both flip-flops 94a and 130 are reset. With the circuit 94' in this condition, the operator can start a cycle of operation by applying the trigger pulse to the lead 18. The monostable multivibrator 10 then begins a single cycle of operation, starting with a positive square pulse and following with a negative square pulse on the output lead 14. The initial positive-going wavefront at the start of the multivibrator cycle is applied over a lead 132 to a differentiating circuit 134. A diode 136 is poled so that it passes only the positive spikes, i.e. those produced by a positive-going wavefront applied to the differentiator 134. Thus, every time the waveform on output lead 14 goes sharply positive the differentiator circuit 134 provides a positive-going spike which passes through the diode 136 and emerges on the flip-flop switching lead 138. This lead is connected so that it always switches the flip-flop 130 from its current condition to its opposite condition, i.e. setting it when it is found in a reset condition, and resetting it when it is found in a set conditon. At the start of the cycle of the monostable multivibrator circuit 10, the flip-flop 130 was in the reset condition. Therefore the output on lead 138 at the start of operations sets flip-flop 130 and therefore disables the gate 96a. This prevents a continuous stream of pulses from the oscillator 30 from being gated into the counters 46 and 56 until the appropriate time later on in the system operating cycle. Instead, during this first phase of the system operating cycle, while multivibrator 10 is going through its single cycle, the insertion of pulses into the counters 46 and 56 remains under the coltrol of gates 20 and 22 and of the multivibrator 10.

When the monostable multivibrator 10 reaches the end of its cycle another sharp positive rise in voltage appears on the output lead 14 and is applied over lead 132 to the differentiating circuit 134. This again results in a positive spike passed through the diode 136 and over the lead 138 to switch the flip-flop 130. This time the flip-flop 130 is reset by the voltage on lead 138. This supplies one of the necessary enabling inputs to the and-gate 96a. In addition, the positive-going wavefront resulting from the resetting of flip-flop 130 is applied over a lead 142 to another differentiating circuit 144. The output of this circuit is also applied through a diode 146 which is poled in the direction to pass only spikes caused by positive-going voltage changes on the lead 142. Positive spikes passed by diode 146 are applied over lead 92a to set the flip-flop 94a. The setting of flip-flop 94a supplies the second necessary enabling lead to the gate 96a. At this point the gate 96a is enabled and the read-out phase of operation begins automatically as pulses from the oscillator 30 begin to be passed continuously through the gate 96a to the counters 46 and 56. At the end of the read-out phase of the operating cycle the output from counter 56 is applied over the lead 112 to reset the flip-flop 94a and thus disable the gate 96a to terminate the read-out operation at the appropriate time.

It will now be appreciated that the three stable conditions of circuit arrangement 94' serve to automatically govern the operating cycle of the system of FIG. 3. The circuit 94' starts off with both flip-flops 130 and 94a reset. Upon triggering of the monostable multivibrator 10 to begin the insertion of the initial count settings into counters 46 and 56, the flip-flop 130 is set while the flip-flop 94a remains reset. This is the second stable condition of circuit arrangement 94' during which it stands by waiting for the monostable multivibrator 10 to complete its single cycle of operation. During this interval the circuit 94' keeps the gate 96a disabled, but has been primed so that the next positive-going voltage change issuing from the monostable multivibrator 10 over the lead 14 will cause it to enable the gate 96a and start the next phase of system of operation.

When this happens the next switching input to the flip-flop 130 resets this flip-flop and thereby causes flip-flop 94a to be set. In this third condition of the circuit arrangement 94' the gate 96a is enabled and the read-out operation proceeds to completion. Upon completion of the read-out, the voltage on lead 112 resets flip-flop 94a to restore circuit 94' to the original stand-by condition.

What has been described is a preferred embodiment and is presently believed to be the best mode of practicing the invention, but it will be clear to those skilled in this art that many modifications may be made without departing from the principles of the invention. Accordingly this description is intended merely as an illustrative example, the broader scope of the invention being stated in the appended claims.

The invention claimed is:
1. An analog-digital converter comprising:
 an output counter;
 means providing at least one stream of pulses;

means connected for gating pulses into said output counter;

bistable means settable for enabling, and resettable for disabling, said gating means;

and means for setting and thereafter resetting said bistable means to enable and gating means for a measured time to determine the number of pulses gated into said output counter, including:

first and second time-measuring counters each producing an output when the count thereof reaches a selected modulus;

said first time-measuring counter being connected for said output thereof to set said bistable means to start said measured time;

said second time-measuring counter being connected for said output thereof to reset said bistable means to end said measured time;

means connected for gating pulses having a selected repetition rate into said first time-measuring counter during a predetermined time interval;

means connected for gating pulses having said selected repetition rate into said second time-measuring counter during a time interval shorter than said predetermined time interval by an amount proportional to a given value of a variable quantity so that the difference between the respective counts entered into said first and second time-measuring counters is also proportional to said given value;

and means connected for thereafter gating a stream of pulses into both of said time-measuring counters until both attain said selected modulus, whereby said measured time is proportional to the difference between the respective counts previously entered into said time-measuring counters.

2. An analog-digital converter comprising:

an output counter;

means providing at least one stream of pulses;

first means connected for gating pulses into said output counter;

bistable means settable for enabling, and resettable for disabling, said first gating means;

and means for setting and thereafter resetting said bistable means to enable said first gating means for a measured time to determine the number of pulses gated into said output counter, including:

first and second time-measuring counters each producing an output when the count thereof reaches a selected modulus;

said first time-measuring counter being connected for said output thereof to set said bistable means to start said measured time;

said second time-measuring counter being connected for said output thereof to reset said bistable means to end said measured time;

respective first and second or-circuits connected for passing pulses into said first and second time-measuring counters;

second means connected for gating pulses having a selected repetition rate into said first or-circuit;

third means connected for gating pulses having said selected repetition rate into said second or-circuit;

and means enabling said second gating means for a predetermined time interval and enabling said third gating means for a time interval shorter than said predetermined time interval by an amount proportional to a given value of a variable quantity so that the difference between the respective counts entered into said first and second time-measuring counters is also proportional to said given value;

and fourth means connected for thereafter gating a stream of pulses into both of said or-circuits until both said time-measuring counters attain said selected modulus, whereby said measured time is proportional to the difference between the respective counts previously entered into said time-measuring counters.

3. An analog-digital converter comprising:

an output counter;

means providing at least one stream of pulses;

first means connected for gating pulses into said output counter;

bistable means settable for enabling, and resettable for disabling, said first gating means;

and means for setting and thereafter resetting said bistable means to enable said first gating means for a measured time to determine the number of pulses gated into said output counter, including:

first and second time-measuring counters each producing an output when the count thereof reaches a selected modulus;

said first time-measuring counter being connected for said output thereof to set said bistable means to start said measured time;

said second time-measuring counter being connected for said output thereof to reset said bistable means to end said measured time;

respective first and second or-circuits connected for passing pulses into said first and second time-measuring counters;

second means connected for gating pulses having a selected repetition rate into said first or-circuit;

third means connected for gating pulses having said selected repetition rate into said second or-circuit;

and means enabling said second gating means for a predetermined time interval and enabling said third gating means for a time interval shorter than said predetermined time interval by an amount proportional to a given value of a variable quantity so that the difference between the respective counts entered into said first and second time-measuring counters is also proportional to said given value;

fourth means connected for thereafter gating a stream of pulses into both of said or-circuits until both said time-measuring counters attain said selected modulus, whereby said measured time is proportional to the difference between the respective counts previously entered into said time-measuring counters;

and means responsive to the output of said second time-measuring counter to disable said fourth gating means.

4. An analog-digital converter comprising:

an output counter;

means providing at least one stream of pulses;

first means connected for gating pulses into said output counter;

first bistable means settable for enabling, and resettable for disabling, said first gating means;

and means for setting and thereafter resetting said first bistable means to enable said first gating means for a measured time to determine the number of pulses gated into said output counter, including:

first and second time-measuring counters each producing an output when the count thereof reaches a selected modulus;

said first time-measuring counter being connected for said output thereof to set said first bistable means to start said measured time;

said second time-measuring counter being connected for said output thereof to reset said first bistable means to end said measured time;

respective first and second or-circuits connected for passing pulses into said first and second time-measuring counters;

second means connected for gating pulses having a selected repetition rate into said first or-circuit;

third means connected for gating pulses having said selected repetition rate into said second or-circuit;

and means enabling said second gating means for a predetermined time interval and enabling said third gating means for a time interval shorter than said predetermined time interval by an amount proportional to a given value of a variable quantity so that the difference between the respective counts entered into said first and second time-measuring counters is also proportional to said given value;

fourth means connected for there after gating a stream of pulses into both of said or-circuits until both said time-measuring counters attain said selected modulus, whereby said measured time is proportional to the difference between the respective counts previously entered into said time-measuring counters;

second bistable means connected to enable and disable said fourth gating means;

means for setting said second bistable means to enable said fourth gating means whereby to start a reading;

and means responsive to the output of said second time-measuring counter to reset said second bistable means at the end of said reading.

5. An analog-digital converter comprising:
an output counter;
means providing at least one stream of pulses;
first means connected for gating pulses into said output counter;
bistable means settable for enabling, and resettable for disabling, said gating means;
and means for setting and thereafter resetting said bistable means to enable said gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
and fourth means connected for thereafter gating a stream of pulses into both of said time-measuring counters until both attain said selected modulus, whereby said measured time is proportional to the difference between the respective counts previously entered into said time-measuring counters.

6. An analog-digital converter comprising:
an output counter;
means providing at least one stream of pulses;
first means connected for gating pulses into said output counter;
bistable means settable for enabling, and resettable for disabling, said gating means;
and means for setting and thereafter resetting said bistable means to enable said gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
means preventing said multivibrator from enabling said second and third gating means after only one full multivibrator cycle;
and fourth means connected for thereafter gating a stream of pulses into both of said time-measuring counters until both attain said selected modulus, whereby said measured time is proportional to the difference between the respective counts previously entered into said time-measuring counters.

7. An analog-digital converter comprising:
an output counter;
means providing at least one stream of pulses;
first means connected for gating pulses into said output counter;
bistable means settable for enabling, and resettable for disabling, said gating means;
and means for setting and thereafter resetting said bistable means to enable said gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a monostable multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;

and fourth means connected for thereafter gating a stream of pulses into both of said time-measuring counters until both attain said selected modulus, whereby said measured time is proportional to the difference between the respective counts previously entered into said time-measuring counters.

8. An analog-digital converter comprising:
an output counter;
means providing at least one stream of pulses;
first means connected for gating pulses into said output counter;
bistable means settable for enabling, and resettable for disabling, said gating means;
and means for setting and thereafter resetting said bistable means to enable said gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a monostable multivibrator;
the duration of one polarity of the cycle of said multivibrator being equal to a predetermined time interval;
means connected to make tthe duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
fourth means connected for thereafter gating a stream of pulses into both of said time-measuring counters until both attain said selected modulus, whereby said measured time is proportional to the difference between the respective counts previously entered into said time-measuring counters;
and means responsive to the output of said second time-measuring counter to disable said fourth gating means.

9. An analog-digital converter comprising:
an output counter;
means providing at least one stream of pulses;
first means connected for gating pulses into said output counter;
first bistable means settable for enabling, and resettable for disabling, said first gating means;
and means for setting and thereafter resetting said first bistable means to enable said first gating means for a measured time to determine the number of pulses gated into said output counter, including:
first and second time-measuring counters each producing an output when the count thereof reaches a selected modulus;
said first time-measuring counter being connected for said output thereof to set said first bistable means to start said measured time;
said second time-measuring counter being connected for said output thereof to reset said first bistable means to end said measured time;
a monostable multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
fourth means connected for thereafter gating a stream of pulses into both of said time-measuring counters until both attain said selected modulus, whereby said measured time is proportional to the difference between the respective counts previously entered into said time-measuring counters;
second bistable means;
means for setting said second bistable means to enable said fourth gating means whereby to start a reading;
and means responsive to the output of said second time-measuring counter to reset said second bistable means at the end of said reading.

10. An analog-digital converter comprising:
an output counter;
means providing at least one stream of pulses;
first means connected for gating pulses into said output counter;
first bistable means settable for enabling, and resettable for disabling, said first gating means;
and means for setting and thereafter resetting said first bistable means to enable said first gating means for a measured time to determine the number of pulses gated into said output counter, including:
first and second time-measuring counters each producing an output when the count thereof reaches a selected modulus;
said first time-measuring counter being connected for said output thereof to set said first bistable means to start said measured time;
said second time-measuring counter being connected for said output thereof to reset said first bistable means to end said measured time;
a monostable multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
fourth means connected for thereafter gating a stream of pulses into both of said time-measuring counters until both attain said selected modulus, whereby said measured time is proportional to the difference between the respective counts previously entered into said time-measuring counters;
means for triggering said multivibrator to insert counts into said first and second time-measuring counters;
second bistable means;

means for setting said second bistable means to enable said fourth gating means whereby to start a reading;

and means responsive to the output of said second time-measuring counter to reset said second bistable means at the end of said reading.

11. An analog-digital converter comprising:
an output counter;
means providing at least one stream of pulses;
first means connected for gating pulses into said output counter;
bistable means settable for enabling, and resettable for disabling, said first gating means;
and means for setting and thereafter resetting said bistable means to enable said first gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a monostable multivibrator;
the duration of one polarity of the cycle of said multivibrator being equal to a predetermined time interval;
means connected to make the duration of the other polarity of said multivibrator cycle shorter than said predetermined time interval by an amount proportional to a given value of a variable quantity;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said given value;
fourth means connected for thereafter gating a stream of pulses into both of said time-measuring counters until both attain said selected modulus, whereby said measured time is proportional to the difference between the respective counts previously entered into said time-measuring counters;
means settable for enabling said fourth gating means whereby to start a reading;
means responsive to the output of said second time-measuring counter to reset said enabling means at the end of said reading;
and means for triggering said multivibrator to insert counts into said first and second time-measuring counters;
said enabling means being arranged to enable said fourth gating means automatically in response to the end of a full cycle of said multivibrator.

12. An analog-digital converter as in claim 11, wherein said enabling means comprises:
second bistable means settable to provide a first enabling input to said fourth gating means;
third bistable means resettable for providing a second enabling input to said fourth gating means;
means for switching said third bistable means at the start and finish of each cycle of said multivibrator whereby to set said third bistable means to disable said fourth gating means at the start of said multivibrator cycle and reset said third bistable means to provide one of said enabling inputs to said fourth gating means at the end of said multivibrator cycle;
means for setting said second bistable means upon resetting of said third bistable means whereby both of said enabling inputs are provided to said fourth gating means upon resetting of said third bistable means;
and means for resetting said second bistable means to disable said fourth gating means in response to said output of said second time-measuring counter.

13. An analog-digital converter comprising:
an output counter;
means providing at least one stream of pulses;
first means connected for gating pulses into said output counter;
bistable means settable for enabling, and resettable for disabling, said gating means;
and means for setting and thereafter resetting said bistable means to enable said gating means for a measured time to determine the number of pulses gated into said output counter, including:
first and second time-measuring counters each producing an output when the count thereof reaches a selected modulus;
said first time-measuring counter being connected for said output thereof to set said bistable means to start said measured time;
said second time-measuring counter being connected for said output thereof to reset said bistable means to end said measured time;
a magnetic multivibrator;
the duration of one polarity of the cycle of said multivibrator being equal to a predetermined time interval;
a variable voltage connected to make the duration of the other polarity of said multivibrator cycle shorter than said predetermined time interval by an amount proportional to the value of said voltage;
second means connected for gating pulses having a selected repetition rate into said first time-measuring counter during said one polarity of said multivibrator cycle;
third means connected for gating pulses having said selected repetition rate into said second time-measuring counter during said other polarity of said multivibrator cycle, so that the difference between the respective counts entered into said first and second time-measuring counters is proportional to said voltage;
and fourth means connected for thereafter gating a stream of pulses into both of said time-measuring counters until both attain said selected modulus, whereby said measured time is proportional to the difference between the respective counts previously entered into said time-measuring counters.

No references cited.

MAYNARD R. WILBUR, *Primary Examiner.*

A. L. NEWMAN, *Assistant Examiner.*